UNITED STATES PATENT OFFICE.

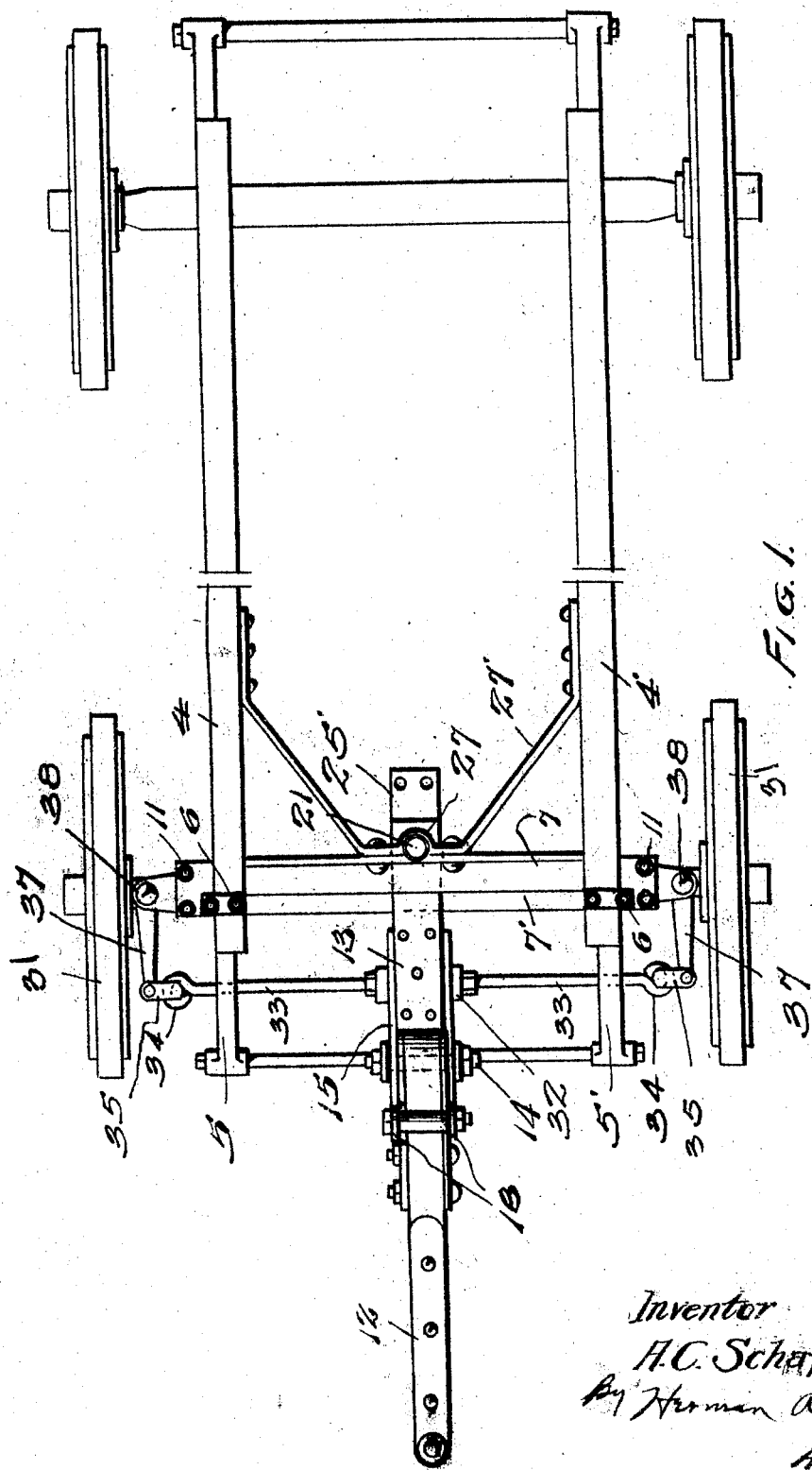

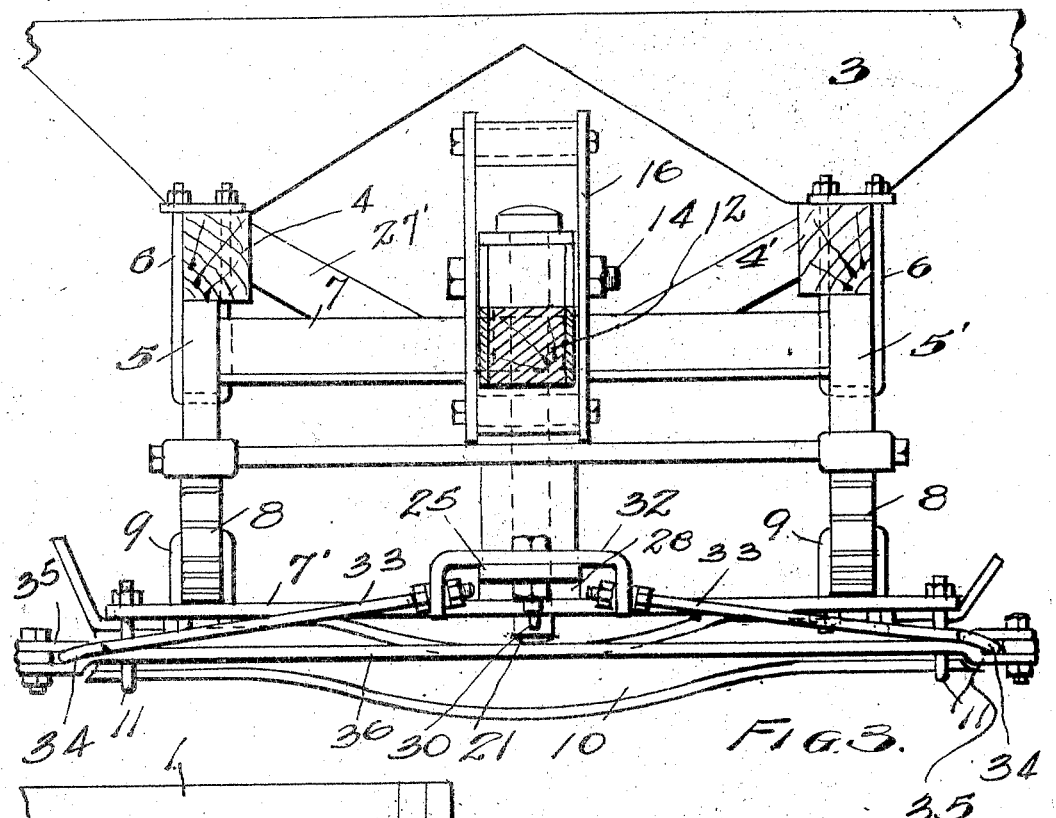
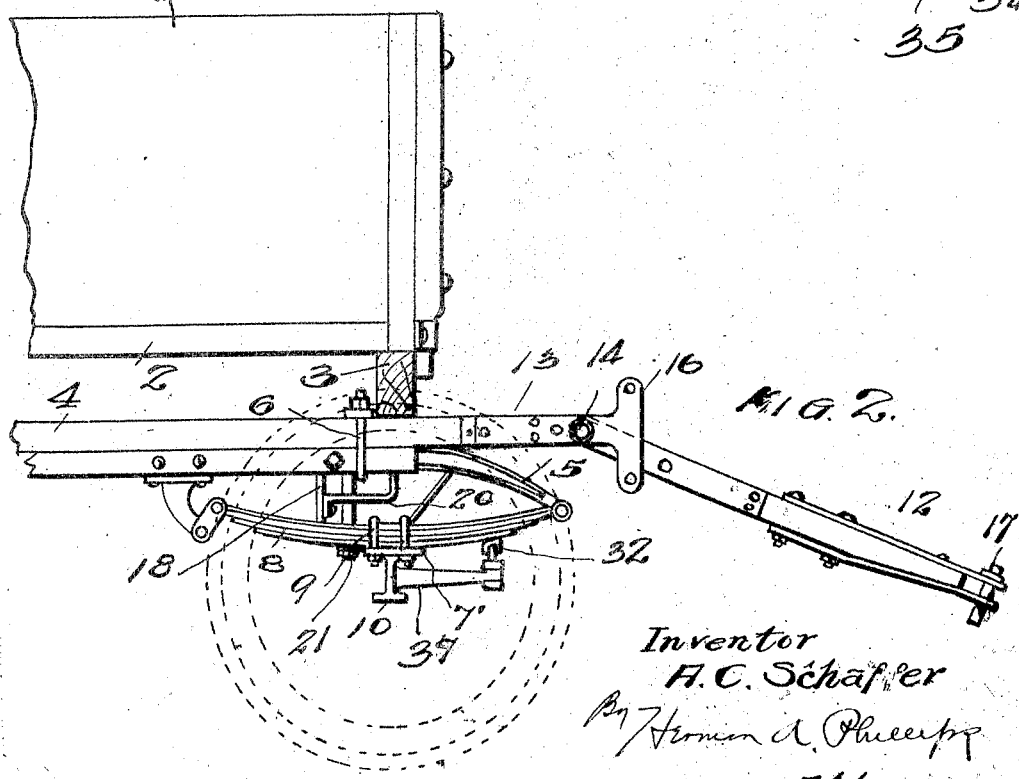

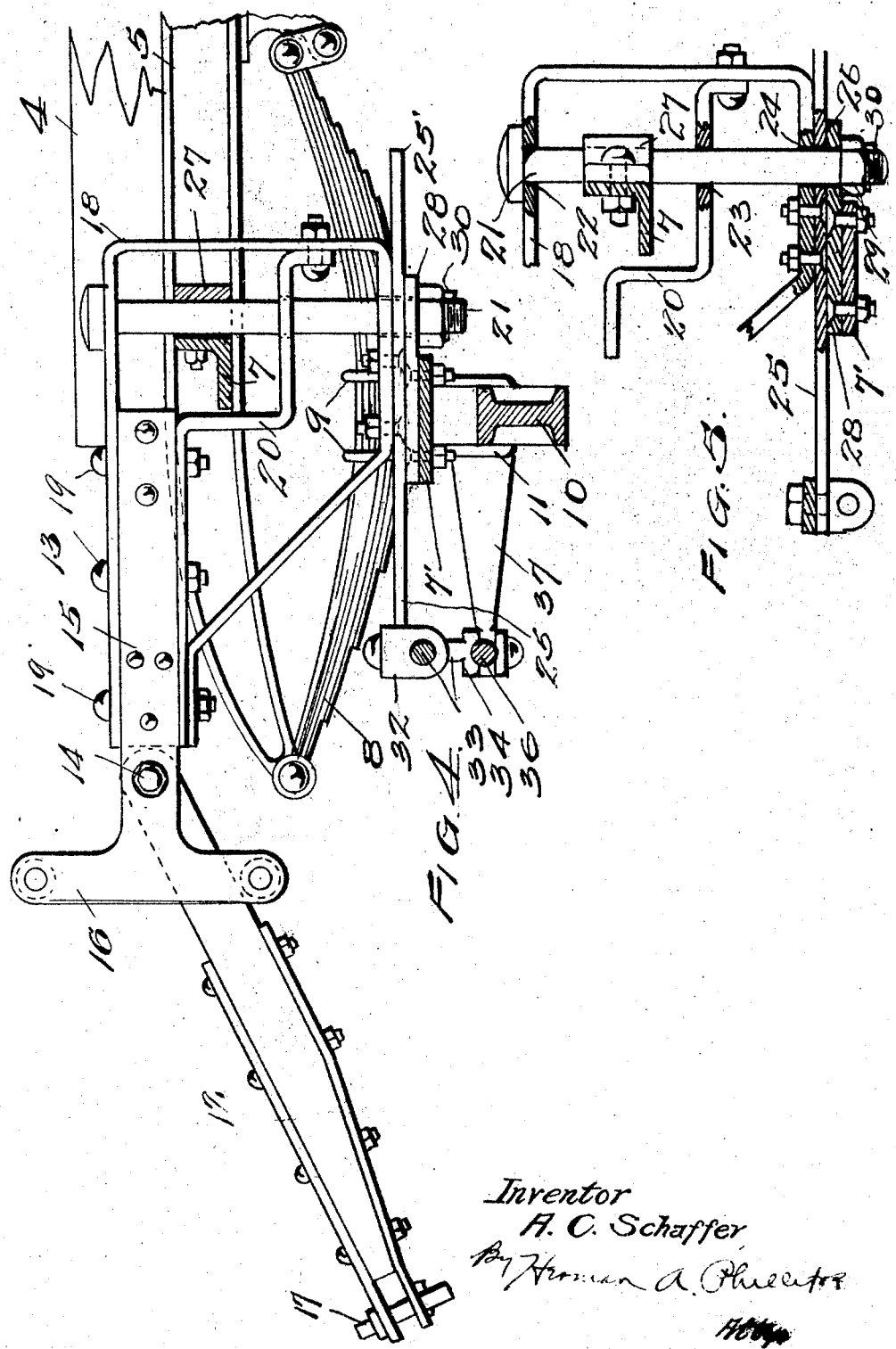

AUGUST C. SCHAFFER, OF SALEM, OREGON.

TRAILER.

1,316,193. Specification of Letters Patent. Patented Sept. 16, 1919.

Application filed December 31, 1918. Serial No. 269,046.

*To all whom it may concern:*

Be it known that I, AUGUST C. SCHAFFER, a citizen of the United States, residing at Salem, in the county of Marion and State of Oregon, have invented certain new and useful Improvements in Trailers, of which the following is a specification.

The present invention relates to an improved trailer and particularly to a new and novel form of tongue attachment and steering connection for the steering wheels of the trailer, and the construction of the attachment adapts it especially for use with the well known form of automobile chassis whereby an automobile may be quickly and conveniently converted into a trailer for special uses.

The invention consists in certain novel combinations and arrangements of parts as will be hereinafter more specifically set forth and claimed.

In the accompanying drawings I have illustrated one complete form of the physical embodiment of the invention, constructed and arranged according to the best mode so far devised for the practical application of the principles of the invention.

Figure 1 is a plan view of the chassis or frame of a trailer with the invention attached thereto and forming a part thereof.

Fig. 2 is a side view of the front of the trailer, showing one of the steering wheels in dotted lines.

Fig. 3 is a front elevation of the frame and part of the front bolster of the trailer, showing the invention on an enlarged scale.

Fig. 4 is a side view of the invention as applied, some parts being shown in section.

Fig. 5 is a sectional detail view showing the king pin and connections.

In the preferred form of the invention as embodied in the drawings I have utilized the well known type of trailer with the body 1 and bottom 2 which are supported on the front bolster 3 which extends transversely of the vehicle and rests upon the two side bars 4, 4' of the frame. These bars form sills and are placed upon the metallic side frame bars 5, 5' of the usual automobile type and the wooden sills and metal side bars are rigidly attached and coupled together by means of the U-bolts 6.

At the front of the frame an additional reinforcing, transverse bar 7 is provided, which is shown as an angle iron and is attached to the two side bars 5 5' of the frame for strengthening the frame and supporting the working parts of the attachment. The usual leaf springs 8 8 are employed, and by the U-bolts 9 they are attached to the transverse metal plate or beam 7' which forms a bed for the axle 10, U-bolts 11 being employed to firmly attach the axle and bed together. These two transverse reinforcing bars 7 and 7' are added to the usual standard chassis when converting an automobile frame for use with my attachment, and of course they form essential elements in the newly constructed vehicle when built according to the invention, for supporting the parts of the invention and for taking the strain of pulls when the vehicle is in use.

The draft appliance comprises a hinged tongue made up of the movable front portion 12 and the rear stud portion 13, the hinge bolt 14 being passed through side plates 15 15 bolted to the rear tongue, and the ends of these plates are formed as a vertically arranged clevis 16 for guiding the vertical movement of the tongue, while the extreme front end of the tongue 12 has a coupling pin 17 for coupling the trailer to the automobile or other power driven vehicle.

At the rear of the rear tongue 13 is attached the steering head 18, which head is in the form of a yoke, of suitable sheet metal, with its ends bolted, as at 19 to the tongue 13, and is strengthened by the strap 20 which is attached to the tongue portion 13 and to the yoke or head.

The head is swiveled on the king bolt 21 which passes vertically through the several perforations 22, 23, 24 in the head, and at the bottom of the yoke a steering arm 25 is bolted, which also is perforated at 26 for the pin to pass through.

The pin is supported, together with the head by the bearing plate 27 bolted to the cross arm 7 of the frame, and also by the fixed plate 28 which is bolted to the brace plate 7' or axle bed, and perforated at 29 for the pin, which has a locking wedge or cotter pin 30 for securing it in position. Thus it will be seen that the tongue is swiveled through its head and that the head with its steering arm can swing horizontally on the pin, while the pin is supported in the fixed bearings at 27 and 28, the turning point being located just to the rear of the axis of the axle 10.

As there is sufficient space between the top of the bearing 27 and the top of head 18 and between the bottom of said bearing and the strap 20, the free movement of the frame is provided for as the springs 8 absorb the movement of the frame in usual manner.

The steering wheels 31 are turned with the head through connections to the steering arm 25 which at its extreme front end has secured thereto a flanged plate 32 to which are attached the two oppositely disposed bars 33 33 having end eyes 34 for engaging the forked ends 35 of the connecting rod 36 which extends transversely between the two steering forks 37 of the knuckle joint 38. When the steering connections for the wheels are at the rear of the front axle, the end 25' of the steering arm 25 is utilized for coupling the parts together.

The steering of the vehicle is accomplished by the action of the tongue, and the strain of the pull is transmitted through the rear tongue portion 13, which is in reality, the draw bar, to the head 18 and thence to the frame of the vehicle through the king pin and its bearings. The flexible connection between the tongue 12 and its draw bar permits the action of the springs, and as before stated the head brace or bearing plate 7 is positioned to permit up and down movement within the head.

Thus the invention provides a device for attachment to the well known four wheel auto-trucks, or touring chassis, to convert the vehicle into a trailer, so that it may be successfully trailed for commercial purposes, and the essential feature of the invention is the construction whereby the strain of the pull is placed on the frame of the trailer while the steering is accomplished through the tongue attached to the front axle.

What I claim is:—

1. The combination with a trailer frame including a front axle and an upper transverse metal plate forming an axle bed, a transverse head brace in the frame and the king pin supported in said brace and bed, of a draw bar and a yoke attached thereto forming a head swiveled on the pin, and a tongue hinged to the draw bar.

2. The combination with a trailer frame and its transverse head brace and a king pin supported therein, of a perforated metallic yoke forming a head and swiveled on the pin, a draw bar attached to the yoke and a tongue hinged to said bar, a longitudinally arranged steering arm attached to the head and parallel with the draw bar, and connections therefrom to the steering wheels for turning the wheels in unison with the movement of the head.

3. The combination with a frame including the axle, an upper transverse metal plate forming an axle bed and a fixed bearing plate on said bed, a transverse bearing brace forming part of the frame and a king pin in said plate and bearing brace, of a metallic yoke forming a head and swiveled on said pin, a draw bar attached to the yoke, a hinged tongue on the bar, a steering arm fixed to the head, steering wheels and steering forks therefor, and oppositely disposed connecting bars between said arm and forks, as described.

In testimony whereof I affix my signature.

AUGUST C. SCHAFFER.